US012659322B2

(12) United States Patent
Paul et al.

(10) Patent No.: US 12,659,322 B2
(45) Date of Patent: Jun. 16, 2026

(54) SYSTEMS AND METHODS FOR IDENTIFYING LEGITIMATE NETWORK TRAFFIC IMITATION

(71) Applicant: Zscaler, Inc., San Jose, CA (US)

(72) Inventors: Sandeep Paul, Bengaluru (IN); Atinderpal Singh, Burnaby (CA); Deepen Desai, San Ramon, CA (US)

(73) Assignee: Zscaler, Inc., San Jose, CA (US)

( * ) Notice: Subject to any disclaimer, the term of this patent is extended or adjusted under 35 U.S.C. 154(b) by 64 days.

(21) Appl. No.: 18/610,882

(22) Filed: Mar. 20, 2024

(65) Prior Publication Data

US 2025/0254183 A1    Aug. 7, 2025

(30) Foreign Application Priority Data

Feb. 2, 2024    (IN) ............................. 202441007049

(51) Int. Cl.
*H04L 9/40* (2022.01)

(52) U.S. Cl.
CPC ...... *H04L 63/1416* (2013.01); *H04L 63/0236* (2013.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 10,757,120 B1 * | 8/2020 | Aziz | ..................... | H04L 63/145 |
| 2021/0105302 A1 * | 4/2021 | Prakash | .............. | G06F 11/3438 |
| 2023/0319108 A1 * | 10/2023 | Gechman | .............. | G06N 3/045 |
| | | | | 726/22 |
| 2023/0353587 A1 | 11/2023 | Bui et al. | | |

* cited by examiner

*Primary Examiner* — Younes Naji
(74) *Attorney, Agent, or Firm* — Baratta Law PLLC; Lawrence A. Baratta, Jr.

(57) ABSTRACT

Systems and methods include performing inline monitoring of traffic within a network environment; requesting a Uniform Resource Identifier (URI) associated with a request within the traffic; responsive to receiving a URI in a response, identifying one or more similar URIs, the one or more similar URIs being associated with known legitimate network traffic; and determining if the request is one of benign or malicious based on a comparison between the received URI and the one or more similar URIs.

18 Claims, 6 Drawing Sheets

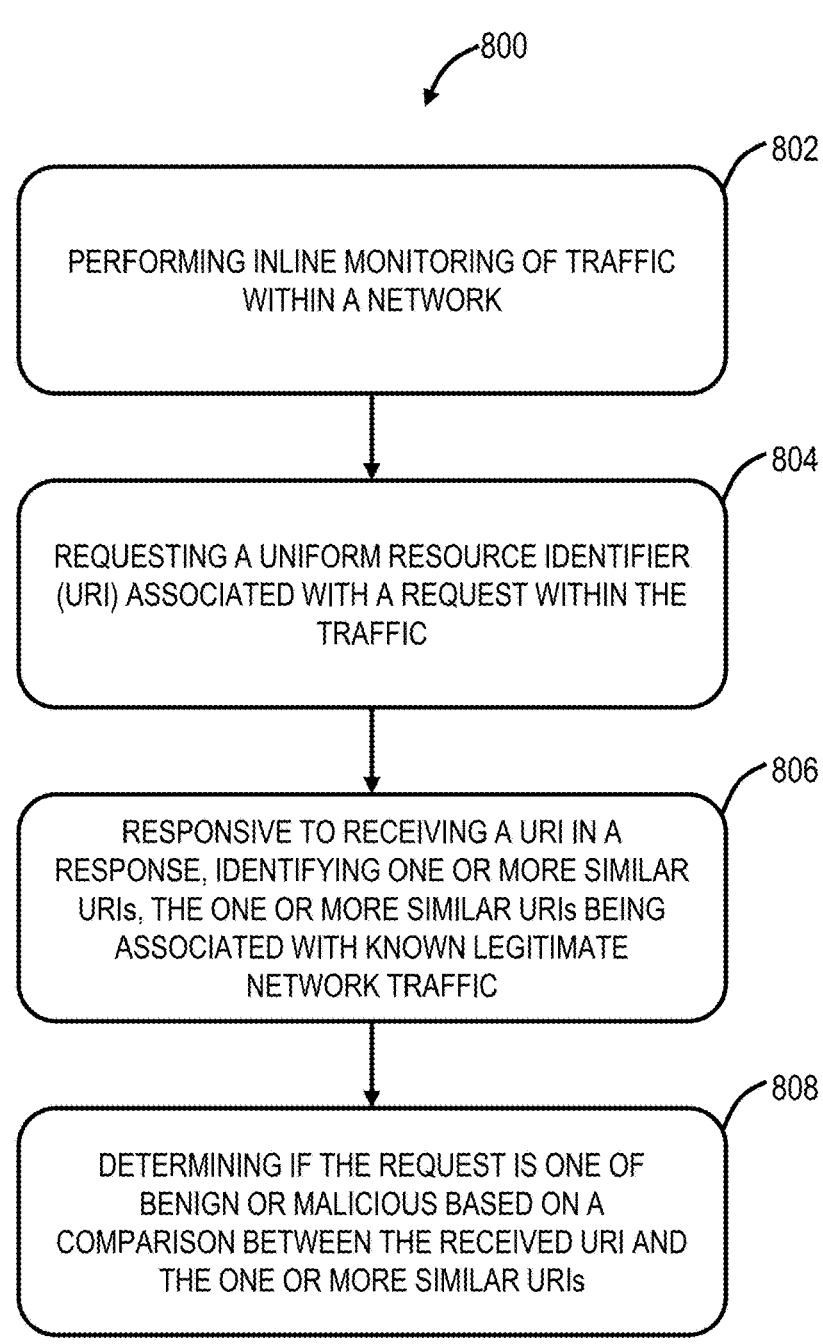

800

802

PERFORMING INLINE MONITORING OF TRAFFIC
WITHIN A NETWORK

804

REQUESTING A UNIFORM RESOURCE IDENTIFIER
(URI) ASSOCIATED WITH A REQUEST WITHIN THE
TRAFFIC

806

RESPONSIVE TO RECEIVING A URI IN A
RESPONSE, IDENTIFYING ONE OR MORE SIMILAR
URIs, THE ONE OR MORE SIMILAR URIs BEING
ASSOCIATED WITH KNOWN LEGITIMATE
NETWORK TRAFFIC

808

DETERMINING IF THE REQUEST IS ONE OF
BENIGN OR MALICIOUS BASED ON A
COMPARISON BETWEEN THE RECEIVED URI AND
THE ONE OR MORE SIMILAR URIs

FIG. 8

SYSTEMS AND METHODS FOR IDENTIFYING LEGITIMATE NETWORK TRAFFIC IMITATION

FIELD OF THE DISCLOSURE

The present disclosure generally relates to computer networking systems and methods. More particularly, the present disclosure relates to systems and methods for identifying legitimate network traffic imitation within network environments.

BACKGROUND OF THE DISCLOSURE

The cyberthreat landscape continues to grow progressively worse by the day. More and more sophisticated attacks are spotted in the wild, and security teams are scrambling to keep up. There are many new types of issues faced by security administrators including attackers attempting to hide malicious traffic by imitating legitimate network traffic. By doing so, attackers can stay under the radar and bypass many security measures without raising any alarms. That is, the imitation can be so real, that until and unless examined carefully, it would even delude experienced network security administrators and researchers. The present disclosure provides systems and methods for identifying malicious network traffic which is attempting to blend in by mimicking legitimate traffic. The present solutions are active solutions that can be deployed in production environments and monitor/act on real-time traffic.

BRIEF SUMMARY OF THE DISCLOSURE

The present disclosure relates to systems and methods for identifying legitimate network traffic imitation within cloud environments. Specifically, the present disclosure provides various processes for identifying whether monitored network traffic is maliciously trying to imitate legitimate traffic. The various steps described herein include extracting components of traffic to identify any similar known legitimate traffic that it can be compared to. By comparing the traffic to similar known legitimate traffic, the systems can determine if the traffic is legitimate or maliciously attempting to mimic network traffic.

Systems and methods include steps of performing inline monitoring of traffic within a cloud environment; requesting a uniform resource identifier (URI) associated with a request within the traffic; responsive to receiving a URI response, identifying one or more similar URIs, the one or more similar URIs being associated with known legitimate network traffic; and determining if the request is one of benign or malicious based on a comparison between the received URI and the one or more similar URIs.

The steps can further include determining if the request is attempting to imitate legitimate network traffic based on the comparison. The steps can further include processing the received URI, a request header, and a response header into components; identifying one or more similar URIs based on the components; and performing a comparison between the components of the received URI, request header, and response header and the one or more similar URIs. The determining can be based on an order of the components within the received URI, request header, and response header. The determining can be based on differences between components of the URI, the request header, and the response header and the one or more similar URIs, request headers, and response headers of known legitimate traffic.

Identifying one or more similar URIs can include finding similarities between the request and known legitimate network traffic. Identifying one or more similar URIs can include identifying one or more keywords associated with the request and identifying one or more similar URIs based thereon. Identifying one or more similar URIs can include referencing a database of known legitimate network traffic characteristics. The steps can include employing a module that is adapted to learn and persist legitimate network traffic characteristics within the cloud environment, and populating the database based thereon. The steps can include performing one or more actions based on the determining, wherein the one or more actions include any of automatically blocking the traffic, automatically allowing the traffic, and sending an alert in real time.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like.

FIG. 8 is a flowchart of a process for legitimate traffic imitation detection.

DETAILED DESCRIPTION OF THE DISCLOSURE

Again, the present disclosure relates systems and methods for identifying legitimate network traffic imitation within cloud environments. Specifically, the present disclosure provides various processes for identifying whether monitored network traffic is maliciously trying to imitate legitimate traffic. The various steps described herein include extracting components of traffic to identify any similar known legitimate traffic that it can be compared to. By comparing the traffic to similar known legitimate traffic, the systems can determine if the traffic is legitimate or maliciously attempting to mimic network traffic.

Example Cloud-Based System Architecture

Figure 1:
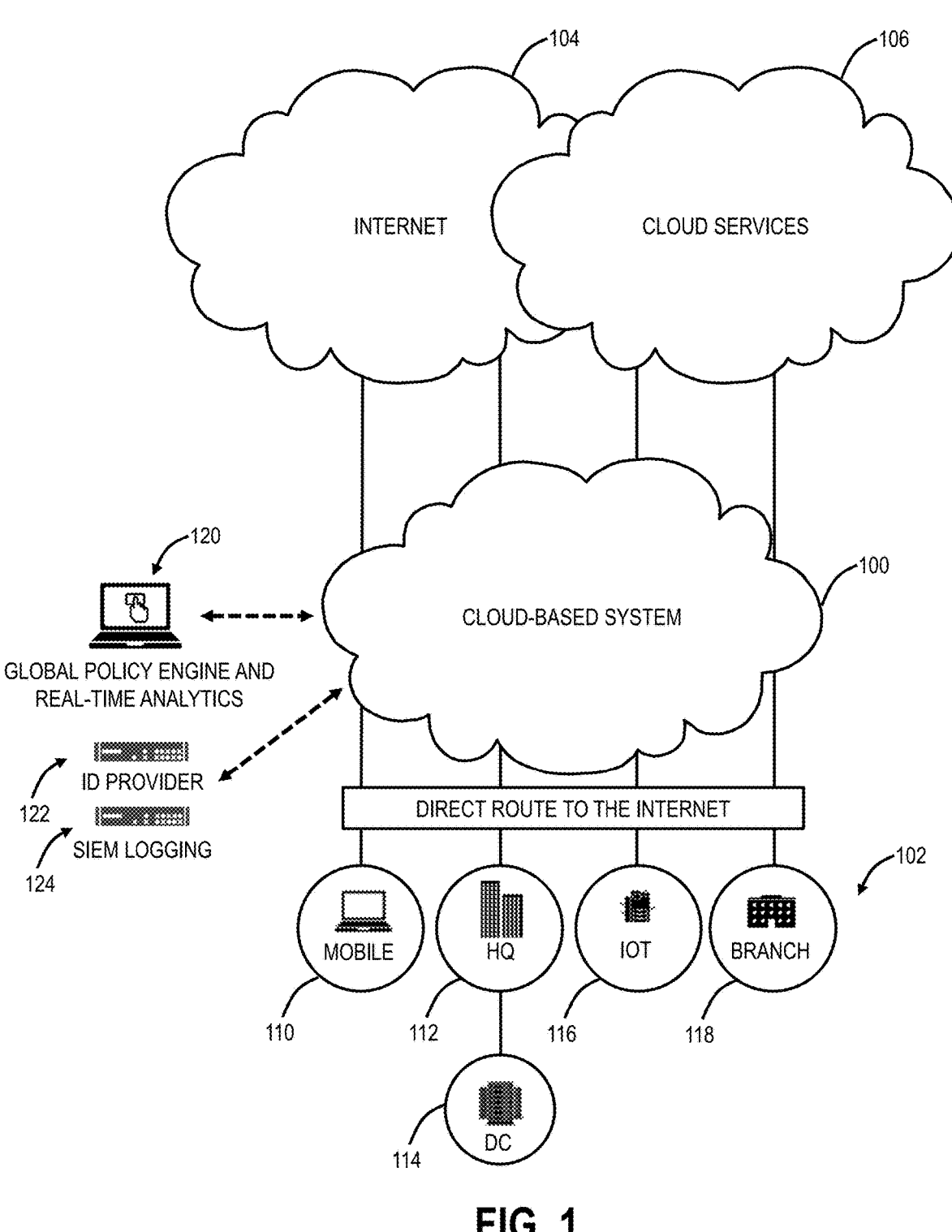
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc. The traffic inspection applies a variety of security features on the traffic, such as in an ordered manner, with the traffic being allowed if it passes all of the security features.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc., protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
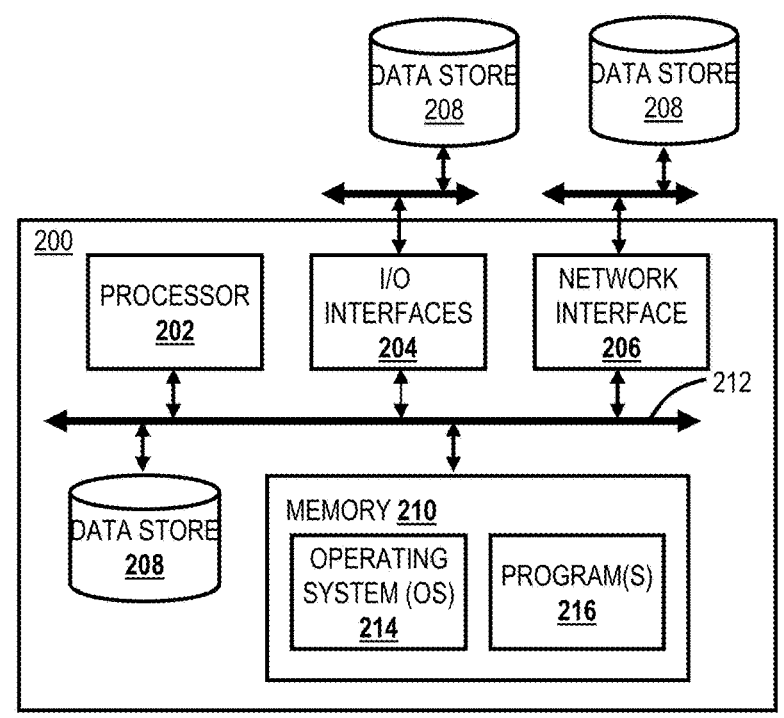

For illustration purposes, the users 102 of the cloud-based system 100 can include a mobile device 110, a headquarters (H.Q.) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the I.T. deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise I.T. administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (I.P.) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables I.T. administrators to have a unified view of user activity, threat intelligence, application usage, etc. For example, I.T. administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
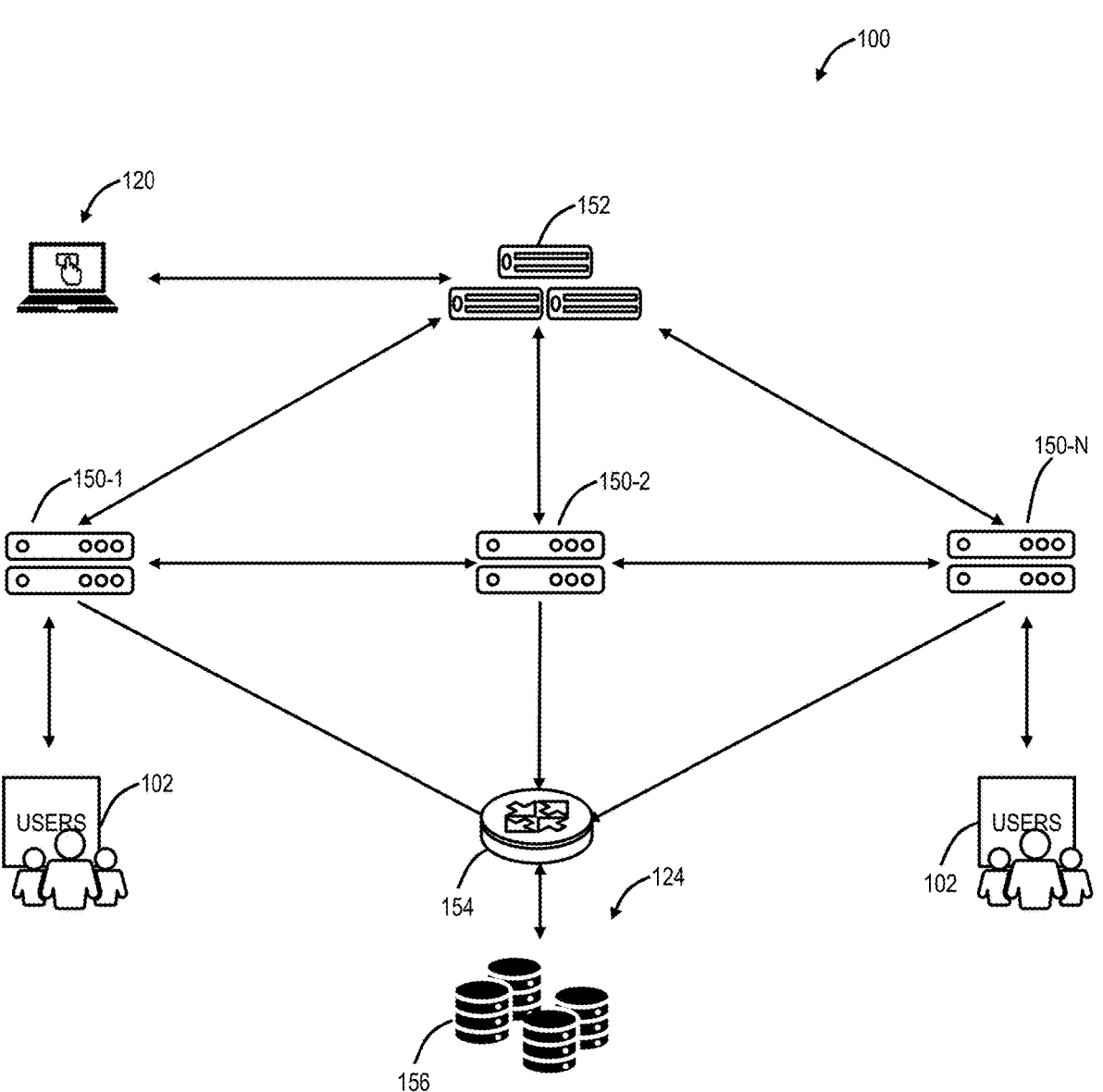
FIG. 2 is a network diagram of an example implementation of the cloud-based system.

FIG. 2 is a network diagram of an example implementation of the cloud-based system 100. In an embodiment, the cloud-based system 100 includes a plurality of nodes (EN)

150, labeled as nodes 150-1, 150-2, 150-N, interconnected to one another and interconnected to a central authority (CA) 152. The nodes 150, 152, while described as nodes, can include one or more servers, including physical servers, virtual machines (V.M.) executed on physical hardware, etc. An example of a server is illustrated in FIG. 2. The cloud-based system 100 further includes a log router 154 that connects to a storage cluster 156 for supporting log maintenance from the nodes 150. The central authority 152 provides centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150. Of note, the cloud-based system is an external system meaning it is separate from tenant's private networks (enterprise networks) as well as from networks associated with the devices 110, 116, and locations 112, 118.

The nodes 150 are full-featured secure internet gateways that provide integrated internet security. They inspect all web traffic bi-directionally for malware and enforce security, compliance, and firewall policies, as described herein. In an embodiment, each node 150 has two main modules for inspecting traffic and applying policies: a web module and a firewall module. The nodes 150 are deployed around the world and can handle hundreds of thousands of concurrent users with millions/billions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is process through one of the nodes 150.

Each of the nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to an node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Domain Detection System

Figure 4:
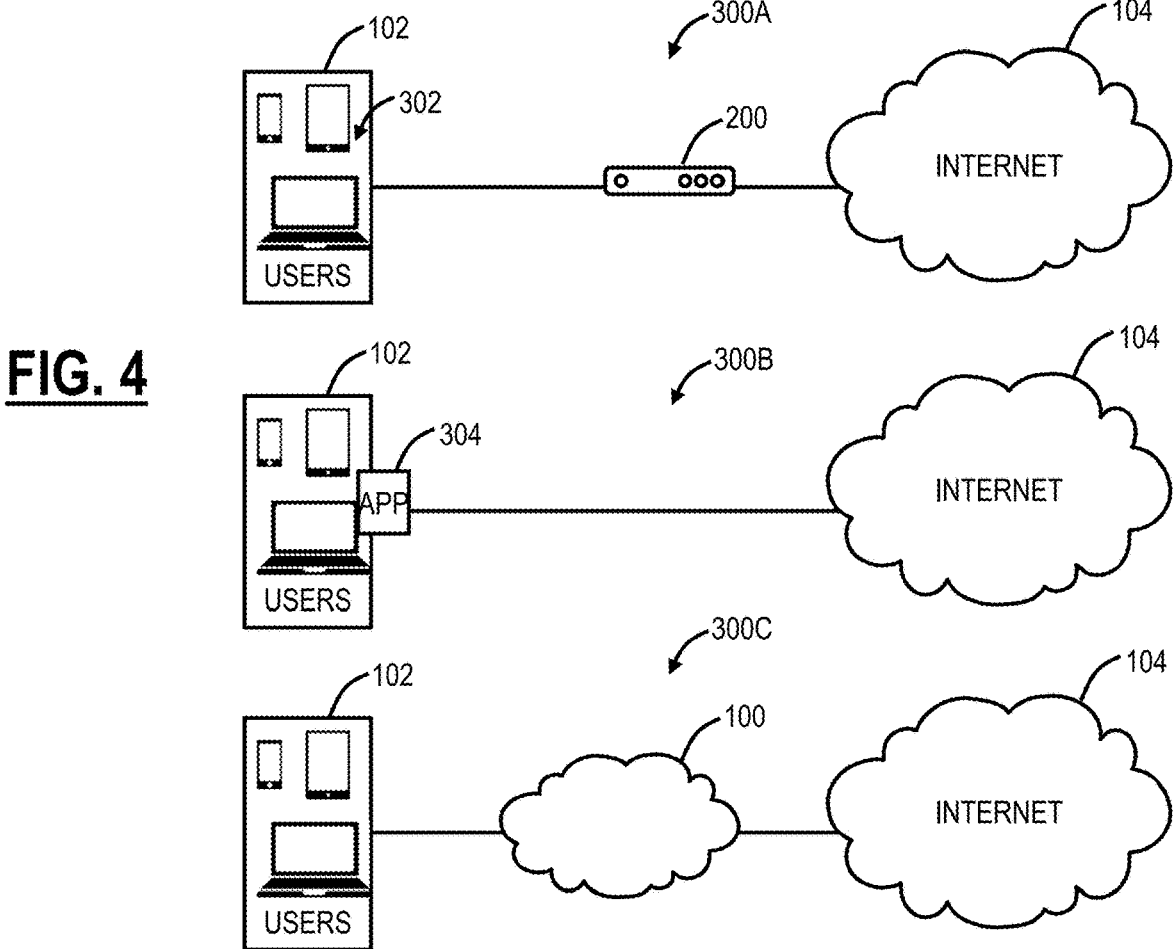
FIG. 4 is a network diagram of three example network configurations of malicious domain detection between a user (each having a user device) and the Internet.

FIG. 4 is a network diagram of three example network configurations 300A, 300B, 300C of malicious domain detection between a user 102 (each having a user device 302) and the Internet 104. The objective of the malicious domain detection is to identify a URL requested by the user 102 as malicious or benign, and to block and/or flag malicious URLs and allow benign URLs. For example, the malicious URLs can be physically blocked so that the user 102 is unable to access these sites. Alternatively, the malicious URLs can be flagged to the user, e.g., "this site is a potential phishing/malicious site," allowing the user to proceed with caution. In a further embodiment, the malicious URLs can be loaded in isolation. Those skilled in the art will recognize the example network configurations 300A, 300B, 300C are described herein for illustration purposes and the phishing detection contemplates use in other approaches.

The network configuration 300A includes a server 200 located between the user 102 and the Internet 104. For example, the server 200 can be a proxy, a gateway, a Secure Web Gateway (SWG), Secure Internet and Web Gateway, etc. The server 200 is illustrated located inline with the user 102 and configured to monitor URL requests for malicious domain detection and remediation. In other embodiments, the server 200 does not have to be inline. For example, the server 200 can monitor the URL requests and provide feedback to the user 102 or specific actions to the user device 302. The server 200 can be on a local network associated with the user 102 as well as external, such as on the Internet 104. The network configuration 300B includes an application 304 that is executed on the user device 302. The application 304 can perform the same functionality as the server 200, as well as coordinated functionality with the server 200. Finally, the network configuration 300C includes a cloud service such as through the cloud-based system 100 configured to monitor the user 102 and perform the malicious domain detection. Of course, various embodiments are contemplated herein, including combinations of the network configurations 300A, 300B, 300C together.

The overall objective of the malicious domain detection includes identifying whether or not a URL is a malicious or benign site and allowing/blocking/alerting based thereon. To that end, the malicious domain detection can include the maintenance of a block list that includes all URLs categorized as malicious. The malicious domain detection can add newly categorized sites to this list as well. For example, the application 302 may be a browser add-in or agent that prohibits access to any sites in the list. Also, the cloud-based system 100 can block/allow/isolate requests based on the categorization.

Machine Learning in Network Security

Machine learning can be used in various applications, including malware detection, intrusion detection, threat classification, the user or content risk, detecting malicious clients or bots, etc. In a particular use case in the present disclosure, machine learning can be used to analyze a new domain. That is, a machine learning model is built and trained as described herein to determine the likelihood a new domain is benign or malicious. As described here, the typical machine learning training process collects data samples with labels (benign or malicious), extracts a set of features from these samples, and feeds the features into a machine learning model to determine patterns. The output of this training process is a machine learning model that can predict the likelihood a new domain is benign or malicious, in production.

Domain Reputation

An input of the malicious domain detection can be a domain reputation database that includes the categorization of sites. This can also be a service that can classify new domains helping with threat detection to identify if a given domain is likely to be malicious. Note that the word "likely" is emphasized because the focus is on the unknown threats; if a domain is known to be bad (because it was associated with a known threat for example) then it should have been blocked already, i.e., already in the domain reputation database.

An objective of the present disclosure is to determine a reputation score that reflects the likelihood of a good domain (or malicious domain). For example, a score between 0 and 100 with a lower score means more likely to be bad. The reputation score can be used in combination with other techniques as described herein, such as phishing site detection, C2 detection, smart browser isolation, and the like.

There is a need for data, for training and production. Regarding the data, below are some relevant data sources that can be used herewith.

The WHOIS database contains all registered domain names and is publicly available. The WHOIS database includes the contact information of the registrant, nameservers, various dates, and the like.

A passive DNS database includes historical DNS records and may be obtained via third-parties.

One important data source is the logs from the cloud-based system 100, stored in the storage cluster 156. The cloud-based system 100 is multi-tenant and supports the security monitoring of millions of users. For example, the cloud-based system 100 can monitor hundreds of billions of transactions every day for many different tenants (organizations). The storage cluster 156 can contain the browsing history of all of the users 102. This is a large amount of data that can be leveraged in machine learning.

further data source can be external databases of known malicious sites, e.g., threat intelligence feeds, or URLs extracted from known malwares.

Legitimate Traffic Imitation Detection

The present disclosure provides systems and methods for detecting and identifying malware traffic attempting to mimic legitimate traffic. Threat actors often implant code in malware to enable communication with threat actor-controlled servers post infection for various reasons. These reasons include data exfiltration, receiving commands for self-update, further malware download, launching Denial-of-Service (DOS)/Distributed Denial-of-Service (DDOS) attacks, etc. Threat actors, in the quest of achieving their intended objectives without getting caught, often blend in with legitimate network traffic. The blending can be so convincing, that until and unless examined carefully, malicious traffic can even delude experienced network and security administrators/researchers.

In some cases of malicious traffic imitating legitimate traffic, similar URIs can be observed, where only the host component of the Uniform Resource Identifier (URI) is different. In other cases, the malicious traffic can imitate benign traffic by having the same host header value, but a different destination server. Even further, malicious traffic can be observed to have similar URIs, but the host, and a small part of either the query string or the fragment component can be different. Similarly, in other cases, the host can be the same, and only a small part of either the query string or the fragment component can be different.

Traditional approaches for detecting malicious traffic are limited to IP blocklists, domain blocklists, URL blocklists, and Deep Packet Inspection (DPI) technologies. These methods are reactive in nature, and thus require regular blocklist updates, frequent signature updates as and when a threat is observed, and lack context.

Threat actors can use network traffic profiles which are developed either actively by sniffing network traffic, or generic/profound profiles can be used to mimic benign traffic and stay hidden. Even though threat actors succeed in thwarting a majority of the detection technologies utilized today and keep posing challenges by blending into normal traffic, there are certain factors, if used in unison, that can be leveraged to effectively counter this ever-growing challenge.

In order to solve these problems and provide a solution that can identify and alert on threat actors trying to blend into normal traffic, the present systems can investigate various traffic characteristics for identifying any anomalies. For example, traffic can be processed inline to detect any suspicious characteristics such as the traffics origin, the time taken to reach its destination, response header ordering, and the like. The present systems are also adapted to request an original server for a page to investigate any of the traffics characteristics. Based on the present systems finding any unusual characteristics, the traffic associated therewith can be blocked. The term unusual can refer to any behavior of the traffic, such as the ordering of a response header or request header, that does not resemble the traffics typical behavior, that is, the behavior of the traffic that the threat actor is trying to mimic. This determination of unusual behavior can be the result of a comparison made between the traffic in question and one or more legitimate traffic samples. These legitimate traffic samples can be chosen based on a similarity between the traffic in question and various legitimate traffic samples. That is, the systems are adapted to determine what legitimate traffic the potentially malicious traffic is attempting to imitate, and perform comparisons thereon.

Such steps provide a scope for detecting sophisticated malicious network traffic used for communication and data exfiltration with Command-and-Control (C&C) servers by blending in normal traffic to evade detection from conventional network security technologies. The present systems also provide scope for detecting certain phishing attacks wherein lookalike sites/webpages hosted on threat actor-controlled servers are used.

Figure 5:
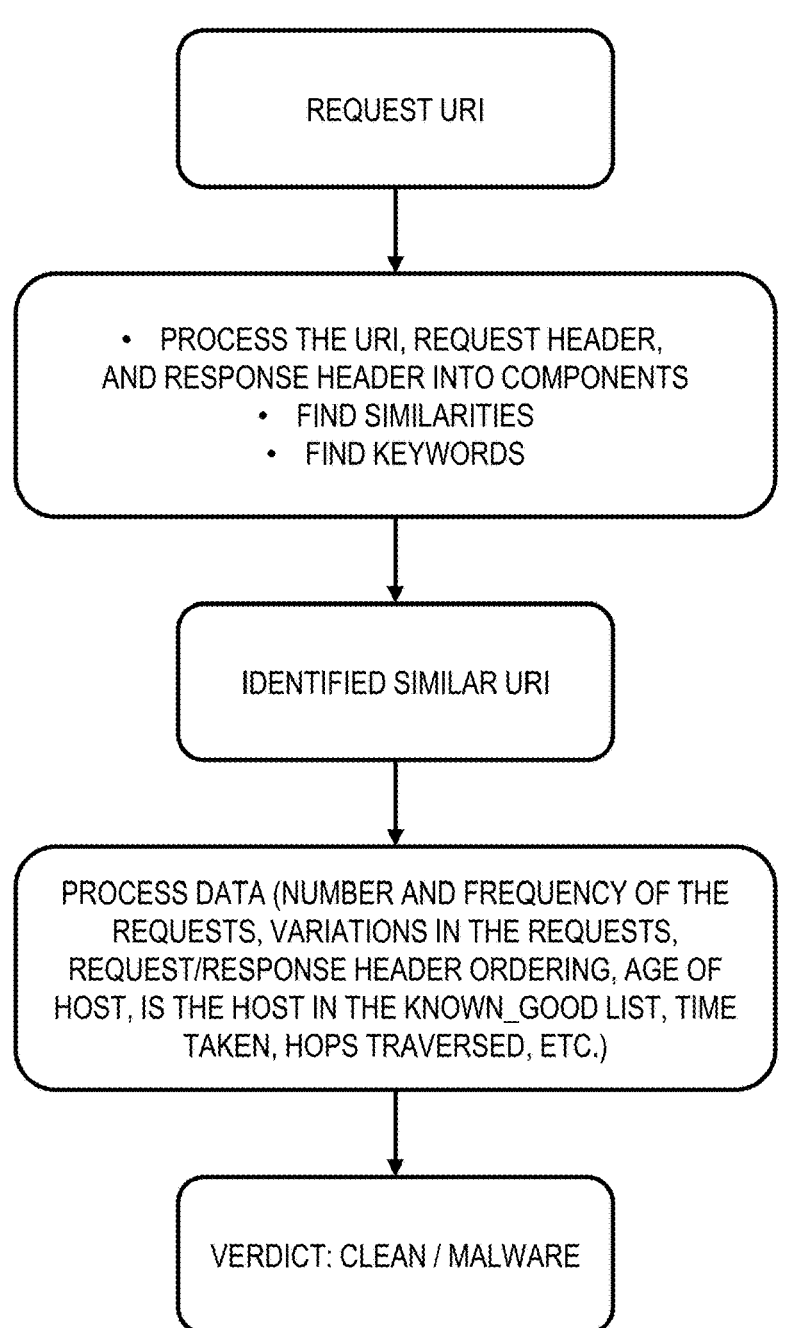
FIG. 5 is a flow diagram of an embodiment of the present legitimate network traffic imitation detection systems and methods.

FIG. 5 is a flow diagram of an embodiment of the present legitimate network traffic imitation detection systems and methods. In various embodiments, and as described herein, traffic can be inspected inline. This inspection can include requesting a URI and a header (request or response) associated with a request within the traffic. A "request" can refer to any traffic that is in question and being processed by the present systems. This URI and headers are processed into components, such as host, query string, fragment component, and the like. Based on these components, the systems can identify any similar URIs, and process the data against any of the similar URIs. The present systems can include a database of learned characteristics from legitimate network traffic to use as a comparison. That is, the systems can identify, from the traffic, a number and frequency of the requests, variations in the requests, request/response header ordering, age of host, is the host in the known_good list, time taken, hops traversed, etc. From this data, the systems can identify if the traffic is legitimate safe network traffic, or malicious traffic imitating legitimate network traffic based on comparisons with similar legitimate traffic from the database. That is, the systems can identify which legitimate network traffic the attacker is trying to imitate, based on the traffics characteristics, and compare components based thereon. As described herein, the present systems are adapted to monitor traffic associated with a cloud environment. When referring to a specific "piece" of traffic, i.e., specific request that is being processed by the present systems, this specific piece of traffic can be referred to as a request within the cloud based systems traffic.

Further, in various embodiments, the systems can find similar traffic for comparison based on keywords. For example, suppose there is a banking portal, and an attacker is pretending to be a banking site. The systems will notice banking keywords such as American Bank, Banking, etc. Even though this is not a legitimate banking site, there are keywords that indicate, or try to make someone believe that it is a legitimate banking site. Once the systems identify what the traffic may be trying to imitate, the systems process the data. Again, this includes a number and frequency of the requests, variations in the requests, request/response header component ordering, age of host, is the host in the known_good list, time taken, hops traversed, etc. This processing can include comparing the traffic in question with the traffic which it may be trying to imitate.

More specifically, for example, if the traffics time taken to reach the destination or intermediate server is different than the typical time similar normal traffic may experience, then the systems can identify this as an anomaly. Similar rational can be contemplated for the number of hops traversed, number and frequency of the requests, etc. The present systems are also adapted to investigate the order of the components in the response header. That is, if the order of the components is different than what is typically seen for this traffic, the traffic may be malicious traffic disguising itself as the typical safe traffic. That is, the ordering of the components within a header can be a characteristic that is learned by the present systems for legitimate traffic.

In order to facilitate such processes, various embodiments include employing a module that is adapted to learn legitimate traffic within an environment. That is, the module can ingest traffic and persist environment traffic characteristics in a database for later use when traffic is inspected for imitation.

Figure 6:
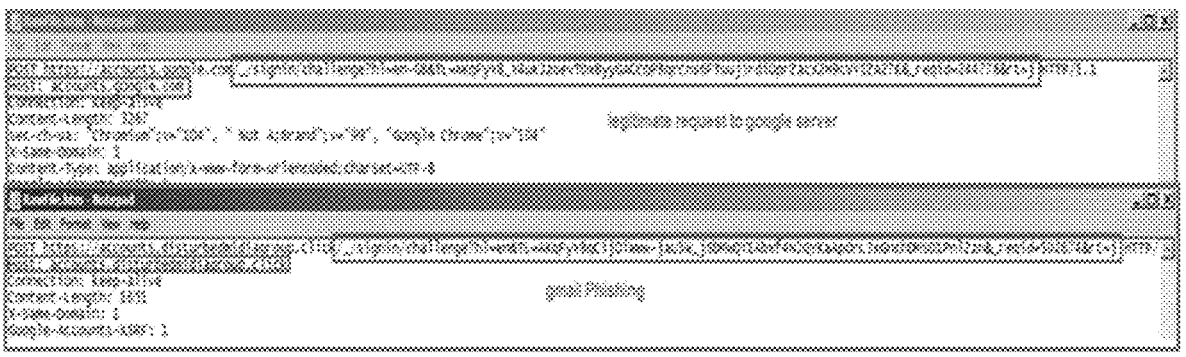
FIG. 6 is an example of malicious traffic having a different host within a response header.
Figure 7:
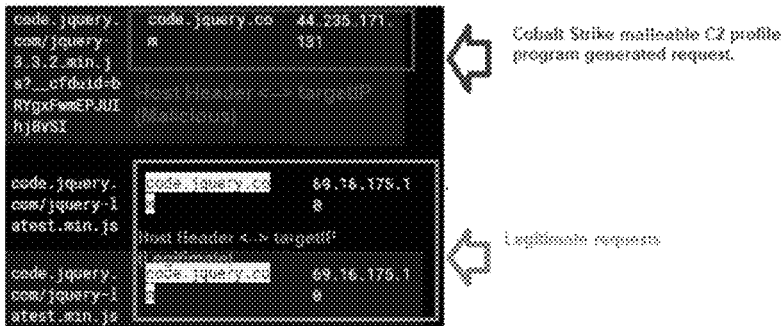
FIG. 7 is an example of malicious traffic having a different destination server.

Malicious traffic that is mimicking safe traffic can look very similar to the safe traffic which it is trying to mimic. Based on this, the components and characteristics of the traffic must be investigated. For example, the malicious traffic will originate from a different location (server) than the traffic which it is trying to mimic, and the malicious traffic can take a longer or shorter time to reach the destination or intermediate server (time taken and hops traversed). Additionally, various characteristics that can be different and detected by the present systems can include web server responses. That is, the server responds in a certain fashion, and the attacker who is mimicking the traffic may not be aware of the pattern in which the response data is being sent. FIG. 6 and FIG. 7 are example comparisons of a response from legitimate traffic, and malicious traffic trying to mimic the legitimate traffic. In FIG. 6 the malicious traffic includes a similar URI, but the host component of the URI is different. In FIG. 7 the malicious traffic includes a similar URI, the host header value is the same as legitimate traffic, but the destination servers are different. These are only two examples of various differences that the present systems can detect between legitimate traffic and malicious traffic which is trying to imitate the legitimate traffic. It will be appreciated that other components of response headers, requests, etc. can be utilized to detect differences that may indicate the traffic being maliciously imitating normal traffic.

Further, an order of these components can also be used to indicate the maliciousness of traffic. That is, the response header will include specific information, and this information can be provided in specific orders. Based on the order in which the header components are listed in the response, the systems can determine if this traffic is unusual, i.e., not legitimate. This is because typically, cloud/network environments are structured in specific ways. For example, an enterprise has 5 servers. It is expected that each of these 5 servers will be configured in the exact same way. If a response is received from a 6th server (or other server that is not one of the 5 servers), and there are differences in the response, such as ordering, headers, etc., the systems can detect this as an anomaly and either investigate further, or alert based thereon. This type of behavior is not expected within an enterprise environment, which makes such detection possible. Thus, the systems take into account the configurations of enterprise resources, and can detect anomalies based thereon.

The present systems and methods can be deployed in various methods including inline, semi-inline, and passive. A passive deployment includes the system recording traffic, learning about legitimate traffic patterns/characteristics, populating the database, and performing the steps described herein on the recorded traffic. A semi-inline deployment includes the system ingesting real live traffic, performing the steps on the live traffic, and alerting administrators if any anomalies are detected. In a full inline deployment, the systems can be adapted to ingest real live traffic and perform actions based on any anomalies detected in real time. These actions can include automatically blocking/allowing the traffic, sending an alert, and the like.

Again, machine learning can be used in various applications, including malware detection, intrusion detection, threat classification, the user or content risk, detecting malicious clients or bots, etc. In a particular use case in the present disclosure, machine learning can be used to analyze network traffic. That is, a machine learning model is built and trained as described herein to determine the likelihood that malicious traffic is imitating legitimate network traffic. As described here, the typical machine learning training process collects data samples, extracts a set of features from these samples, and feeds the features into a machine learning model to determine patterns. The output of this training process is a machine learning model that can predict the likelihood that malicious traffic is imitating legitimate network traffic, in production.

That is, in various embodiments, a machine learning model can be trained with legitimate network traffic. This training can include training the model with legitimate traffic URI components described herein via the database. This machine learning model can then be used in coordination with the present systems in production environments to process traffic inline to determine if there is malicious traffic attempting to imitate legitimate traffic.

Process for Legitimate Traffic Imitation Detection

FIG. 8 is a flowchart of a process 800 for legitimate traffic imitation detection. The process 800 includes steps of performing inline monitoring of traffic within a cloud environment (step 802); requesting a Uniform Resource Identifier (URI) associated with a request within the traffic (step 804); responsive to receiving a response, identifying one or more similar URIs, the one or more similar URIs being associated with known legitimate network traffic (step 806); and determining if the request is one of benign or malicious based on a comparison between the received URI and the one or more similar URIs (step 808).

The process 800 can further include determining if the request is attempting to imitate legitimate network traffic based on the comparison. The steps can further include processing the received URI, a response header, and a request header into components; identifying one or more similar URIs based on the components; and performing a comparison between the components of the received URI, response header, and request header and the one or more similar URIs, response headers, and request headers. The determining can be based on an order of the components within the received URI. The determining can be based on differences between components of the received URI and the one or more similar URIs. Identifying one or more similar URIs can include finding similarities between the request and known legitimate network traffic. Identifying one or more similar URIs can include identifying one or more keywords associated with the request and identifying one or more similar URIs based thereon. Identifying one or more similar URIs can include referencing a database of known legitimate network traffic characteristics. The steps can include employing a module that is adapted to learn and persist legitimate network traffic characteristics within the cloud environment, and populating the database based thereon. The steps can include performing one or more actions based on the determining, wherein the one or more actions include any of automatically blocking the traffic, automatically allowing the traffic, and sending an alert in real time.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read-Only Memory), an EPROM (Erasable Programmable Read-Only Memory), an EEPROM (Electrically Erasable Programmable Read-Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed, cause one or more processors to perform steps of:

performing inline monitoring of traffic within a network;

requesting a Uniform Resource Identifier (URI) associated with a request within the traffic;

responsive to receiving a URI in a response, identifying one or more similar URIs, the identifying including selecting the one or more similar URIs from a database of learned legitimate network-traffic characteristics using similarity between components of the received URI, a request header, a response header, and keywords associated with the request, the one or more similar URIs being associated with known legitimate network traffic; and determining if the request is one of benign or malicious based on a comparison between the received URI and the one or more similar URIs, the comparison including at least (i) an order of header components within the request header and the response header and (ii) network path metrics comprising time to reach a destination and hops traversed.

2. The non-transitory computer-readable medium of claim 1, wherein the determining includes determining if the request is attempting to imitate the legitimate network traffic based on the comparison.

3. The non-transitory computer-readable medium of claim 1, wherein the steps further comprise:

processing the received URI, the response header, and the request header into the components;

identifying the one or more similar URIs based on the components; and performing the comparison between the components of the received URI and the one or more similar URIs, the comparison further including network path metrics comprising end-to-end time and hop count.

4. The non-transitory computer-readable medium of claim 3, wherein the determining is based on an order of the components within any of the received URI, the response header, and the request header, the order of the components corresponding to a learned response-header field-order signature of the legitimate network traffic.

5. The non-transitory computer-readable medium of claim 3, wherein the determining is based on differences of the components between the received URI and the one or more similar URIs, including at least one of (i) a mismatch of the learned response-header field-order signature, (ii) a network path metric outside a learned tolerance window, or (iii) a destination server identity mismatch.

6. The non-transitory computer-readable medium of claim 1, wherein identifying the one or more similar URIs includes finding similarities between the request and the legitimate network traffic, and the determining identifies the request as malicious when a host header value matches the legitimate network traffic but a destination server differs.

7. The non-transitory computer-readable medium of claim 1, wherein identifying the one or more similar URIs includes referencing the database of the learned legitimate network traffic characteristics.

8. The non-transitory computer-readable medium of claim 7, wherein the steps include employing a module that is adapted to learn and persist legitimate network traffic characteristics within the cloud environment, and populating the database based thereon, including learned values of response-header field-order signatures, typical end-to-end time, hop counts, and server identities for the legitimate network traffic.

9. The non-transitory computer-readable medium of claim 1, wherein the steps include performing one or more actions based on the determining, and wherein the one or more actions include any of automatically blocking the traffic, automatically allowing the traffic, and sending an alert in real time.

10. A method comprising steps of:

performing inline monitoring of traffic within a network;

requesting a Uniform Resource Identifier (URI) associated with a request within the traffic;

responsive to receiving a URI in a response, identifying one or more similar URIs, the identifying including selecting the one or more similar URIs from a database of learned legitimate network-traffic characteristics using similarity between components of the received URL a request header, a response header, and keywords associated with the request, the one or more similar URIs being associated with known legitimate network traffic; and determining if the request is one of benign or malicious based on a comparison between the received URI and the one or more similar URIs, the comparison including at least (i) an order of header components within the request header and the response header and (ii) network path metrics comprising time to reach a destination and hops traversed.

11. The method of claim 10, wherein the determining includes determining if the request is attempting to imitate the legitimate network traffic based on the comparison.

12. The method of claim 10, wherein the steps further comprise:

processing the received URI, the response header, and the request header into the components;

identifying the one or more similar URIs based on the components; and performing the comparison between the components of the received URI and the one or more similar URIs, the comparison further including network path metrics comprising end-to-end time and hop count.

13. The method of claim 12, wherein the determining is based on an order of the components within any of the received URI, the response header, and the request header, the order of the components corresponding to a learned response-header field-order signature of the legitimate network traffic.

14. The method of claim 12, wherein the determining is based on differences of the components between the received URI and the one or more similar URIs, including at least one of: (i) a mismatch of the learned response-header field-order signature, (ii) a network path metric outside a learned tolerance window, or (iii) a destination server identity mismatch.

15. The method of claim 10, wherein identifying the one or more similar URIs includes finding similarities between the request and the legitimate network traffic, and the determining identifies the request as malicious when a host header value matches the legitimate network traffic but a destination server differs.

16. The method of claim 10, wherein identifying the one or more similar URIs includes referencing the database of the learned legitimate network traffic characteristics.

17. The method of claim 16, wherein the steps include employing a module that is adapted to learn and persist legitimate network traffic characteristics within the cloud environment, and populating the database based thereon, including learned values of response-header field-order signatures, typical end-to-end time, hop counts, and server identities for the legitimate network traffic.

18. The method of claim 10, wherein the steps include performing one or more actions based on the determining, and wherein the one or more actions include any of automatically blocking the traffic, automatically allowing the traffic, and sending an alert in real time.

\* \* \* \* \*